United States Patent
Chen et al.

(10) Patent No.: US 8,683,805 B2
(45) Date of Patent: Apr. 1, 2014

(54) INJECTOR SEAL FOR A GAS TURBOMACHINE

(75) Inventors: Wei Chen, Greer, SC (US); Kevin Weston McMahan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 19 days.

(21) Appl. No.: 13/567,415

(22) Filed: Aug. 6, 2012

(65) Prior Publication Data

US 2014/0033725 A1 Feb. 6, 2014

(51) Int. Cl.
*F02C 1/00* (2006.01)
*F02C 7/28* (2006.01)

(52) U.S. Cl.
USPC .............................................. 60/740; 60/752

(58) Field of Classification Search
USPC ............ 60/740, 746, 752; 277/408, 500, 512, 277/579
See application file for complete search history.

(56) References Cited

U.S. PATENT DOCUMENTS

| 6,880,341 | B2 * | 4/2005 | Parkman et al. ................ 60/740 |
| 7,101,173 | B2 * | 9/2006 | Hernandez et al. ........... 431/258 |
| 7,640,752 | B2 * | 1/2010 | Gautier et al. ................. 60/796 |
| 8,104,291 | B2 | 1/2012 | Myers et al. |
| 2001/0010416 | A1 * | 8/2001 | Wu et al. ....................... 277/387 |
| 2008/0264033 | A1 * | 10/2008 | Lacy et al. ................... 60/39.49 |
| 2009/0071159 | A1 * | 3/2009 | Parker et al. .................... 60/747 |
| 2009/0243219 | A1 * | 10/2009 | Whitlow et al. .............. 277/306 |
| 2010/0174466 | A1 * | 7/2010 | Davis et al. ................... 701/100 |
| 2010/0212324 | A1 * | 8/2010 | Bronson et al. ................. 60/752 |

* cited by examiner

*Primary Examiner* — Phutthiwat Wongwian
*Assistant Examiner* — Scott Walthour
(74) *Attorney, Agent, or Firm* — Cantor Colburn LLP

(57) ABSTRACT

An injector seal for a gas turbomachine includes a seal body having a first surface, an opposing second surface, a central opening configured and disposed to receive a gas turbomachine injector, an outer edge, and a plurality of passages extending through the seal body. The plurality of passages are configured and disposed to guide a fluid at the first surface through the second surface.

30 Claims, 4 Drawing Sheets

US 8,683,805 B2

INJECTOR SEAL FOR A GAS TURBOMACHINE

BACKGROUND OF THE INVENTION

The subject matter disclosed herein relates to the art of gas turbomachines and, more particularly, to an injector seal for a gas turbomachine.

Many turbomachines include a compressor portion linked to a turbine portion through a common compressor/turbine shaft or rotor and a combustor assembly. The compressor portion guides a compressed air flow through a number of sequential stages toward the combustor assembly. In the combustor assembly, the compressed air flow mixes with a fuel to form a combustible mixture. The combustible mixture is combusted in the combustor assembly to form hot gases. The hot gases are guided to the turbine portion through a transition piece. The hot gases expand through the turbine portion rotating turbine blades to create work that is output, for example, to power a generator, a pump, or to provide power to a vehicle. In addition to providing compressed air for combustion, a portion of the compressed airflow is passed through the turbine portion for cooling purposes.

BRIEF DESCRIPTION OF THE INVENTION

According to one aspect of the exemplary embodiment, an injector seal for a gas turbomachine includes a seal body having a first surface, an opposing second surface, a central opening configured and disposed to receive a gas turbomachine injector, an outer edge, and a plurality of passages extending through the seal body. The plurality of passages are configured and disposed to guide a fluid at the first surface through the second surface.

According to another aspect of the exemplary embodiment, a gas turbomachine includes a compressor portion, a turbine portion operatively connected to the compressor portion, a combustor assembly including at least one combustor having a combustor liner defining a combustion chamber, and a transition piece fluidically connecting the combustor and the turbine portion. The transition piece includes a transition piece liner defining a combustion passage. An injector extends into one of the combustion chamber and the combustion passage through a corresponding one of the combustor liner and transition piece liner. An injector seal surrounds the injector. The injector seal includes a seal body having a first surface, and opposing second surface, a central opening configured and disposed to receive a gas turbomachine injector, an outer edge, and a plurality of passages extending through the seal body. The plurality of passages are configured and disposed to guide a fluid at the first surface through the second surface.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
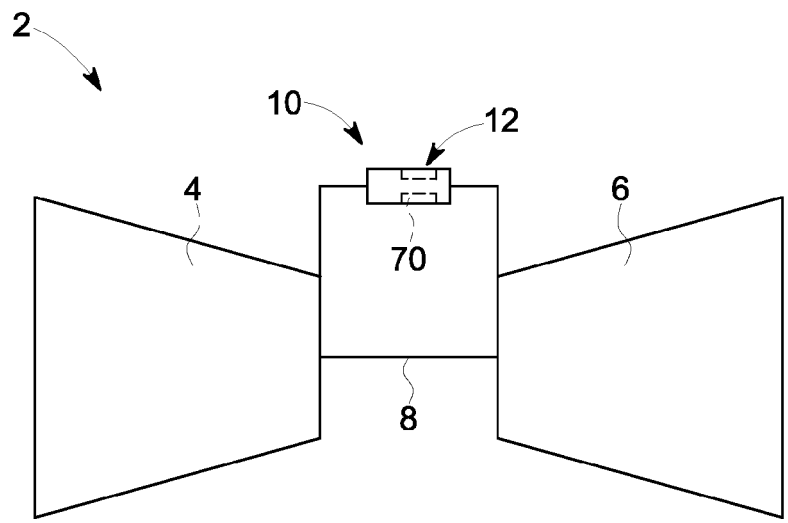
FIG. 1 is a schematic diagram of a turbomachine including a combustor assembly having an injector seal in accordance with an exemplary embodiment.
Figure 2:
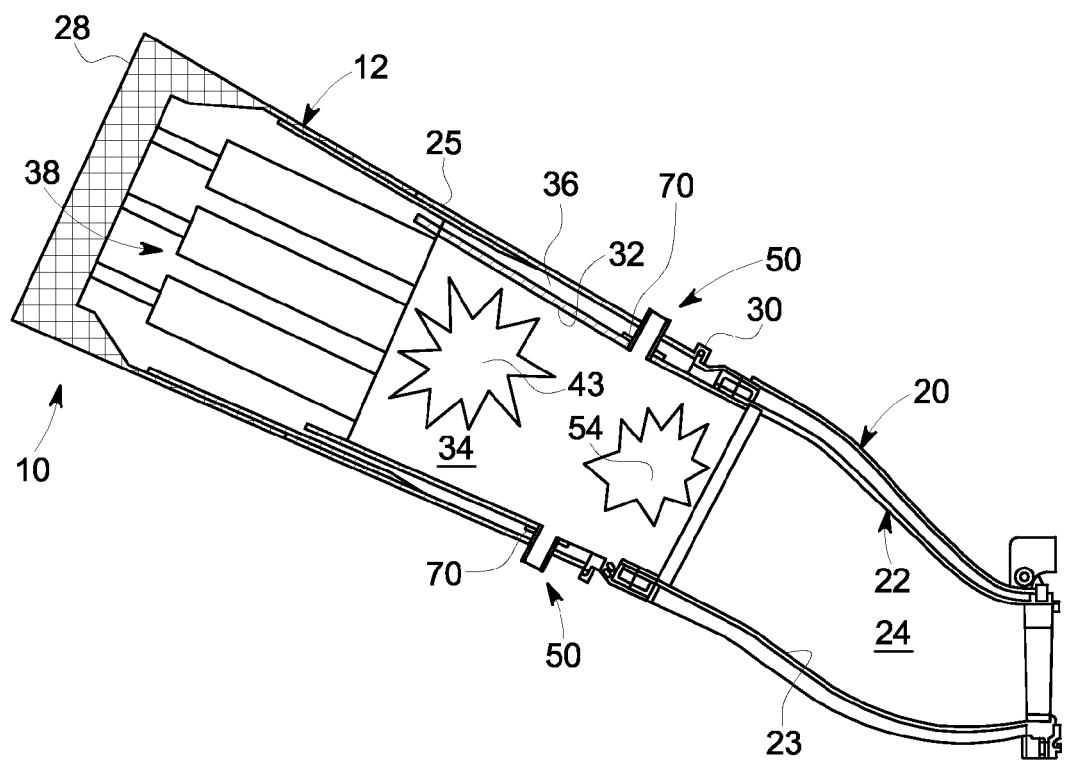
FIG. 2 is a partial cross-sectional view of the combustor assembly of FIG. 1 including an injector seal in accordance with an exemplary embodiment.

With reference to FIGS. 1 and 2, a turbomachine constructed in accordance with an exemplary embodiment is indicated generally at 2. Turbomachine 2 includes a compressor portion 4 operatively coupled to a turbine portion 6 through a common compressor/turbine shaft or rotor 8. Compressor portion 4 is also fluidly connected to turbine portion 6 via a combustor assembly 10 having a combustor 12. In the exemplary embodiment shown, combustor assembly 10 is linked to turbine portion 6 through a transition piece 20. Transition piece 20 includes a liner 22 having an inner surface 23 that defines a duct 24. Duct 24 delivers products of combustion from combustor assembly 10 into a hot gas path (not shown) and toward a first stage (also not shown) of turbine portion 6.

As further shown in FIG. 2, combustor 12 includes an outer wall 25 that extends from a first end portion 28 to a second end portion 30 that is coupled to transition piece 20. Combustor 12 is also shown to include an inner wall or combustor liner 32 that defines a combustion chamber 34. Combustor liner 32 also defines, together with outer wall 25, a fluid flow passage 36. Combustor assembly 10 includes a plurality of injector members indicated generally at 38 that guide a combustible mixture into combustion chamber 34. The combustible mixture from injector members 38 is combusted in a first combustion zone 43 to form hot gases that flow through duct 24 of transition piece 20 toward turbine portion 6. Combustor assembly 10 also includes a plurality of injector assemblies, one of which is indicated at 50, arranged downstream from injector members 38 and first combustion zone 43 and extend through combustor housing 12. In the exemplary embodiment shown, injector assembly 50 takes the form of a late lean injector (LLI) that delivers a second combustible mixture into combustion chamber 34 that is combusted in a second combustion zone 54 arranged downstream from first combustion zone 43. Combustion gases formed in second combustion zone 54 combine with combustion gases formed in first combustion zone 43 and flow towards turbine portion 6. The combustion of the second combustible mixture not only forms additional products of combustion but also facilitates combustion of any un-combusted products passing from first combustion zone 43.

Figure 3:
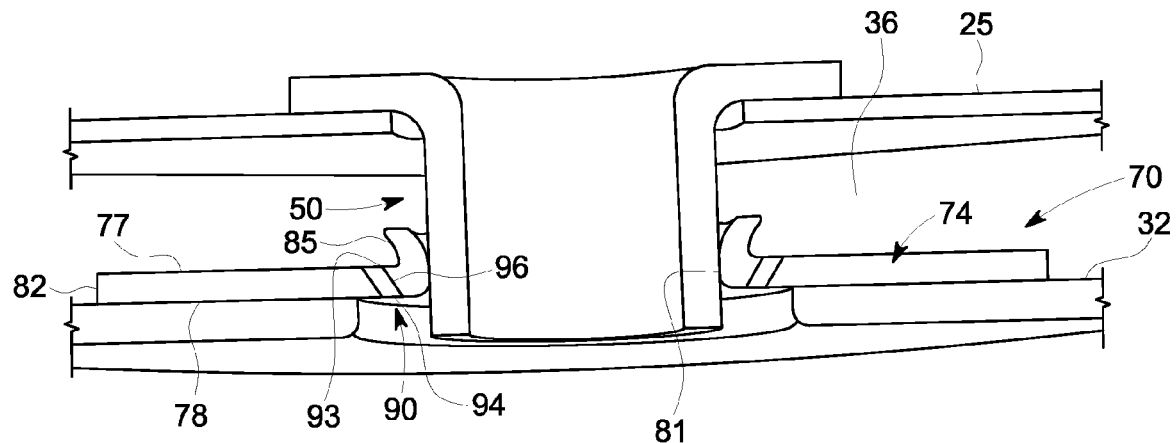
FIG. 3 is a cross-sectional side view of the injector seal of FIG. 2.
Figure 4:
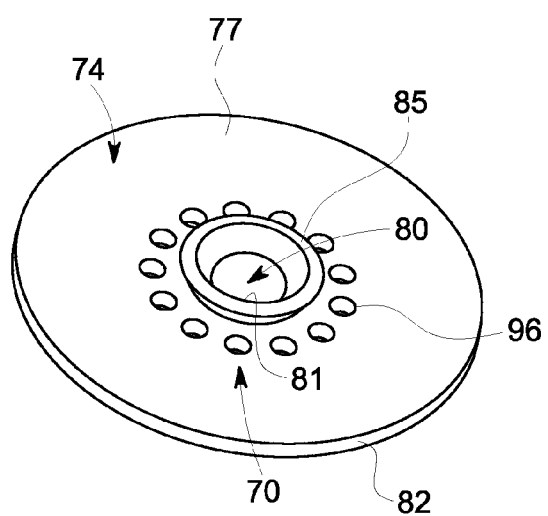
FIG. 4 is a perspective view of the injector seal of FIG. 3.

In accordance with an exemplary embodiment, combustor 12 includes an injector seal 70 arranged about each injector assembly 50 and abuts combustor liner 32. As shown in FIGS. 3 and 4, injector seal 70 includes a seal body 74 including a first surface 77 and an opposing second surface 78. Seal body 74 also includes a central opening 80 defined by an inner edge 81 and an outer, peripheral, edge 82. A flange member 85 extends about inner edge 81 and projects outward from first surface 77. Flange member 85 provides a seal about injector assembly 50 that prevents combustion gases from combustion chamber 34 from entering fluid flow passage 36. Seal body is formed from a nickel-based alloy such as HASTELLOY® X alloy produced by Haynes International of Kokomo, Ind., or Nimonic® produced by Special Metals Corporation of New Hartford N.Y. However, it should be understood that seal body 74 may also be formed from other materials suitable to exposure to a combustion environment.

In accordance with the exemplary aspect shown, injector seal 70 includes a plurality of passages 90 that extend through seal body 74. Each passage 90 includes a first end 93 that extends to a second end 94 through an intermediate portion 96. First end 93 is exposed at first surface 77 which second end 94 is exposed at second surface 78. In further accordance with the exemplary embodiment shown, first end 93 is off-set relative to second end 94 such that intermediate portion 96 is angled relative to an axial axis of seal body 74. Passages 90 provide a conduit that allows gases flowing within fluid flow passage 36 to pass onto, and cool, an end portion (not separately labeled) of injector assembly 50. Thus, injector seal 70 not only prevents combustion gasses from entering into fluid flow passage 36 but also provides passage for fluid to impinge upon and cool injector assembly 50.

Figure 5:
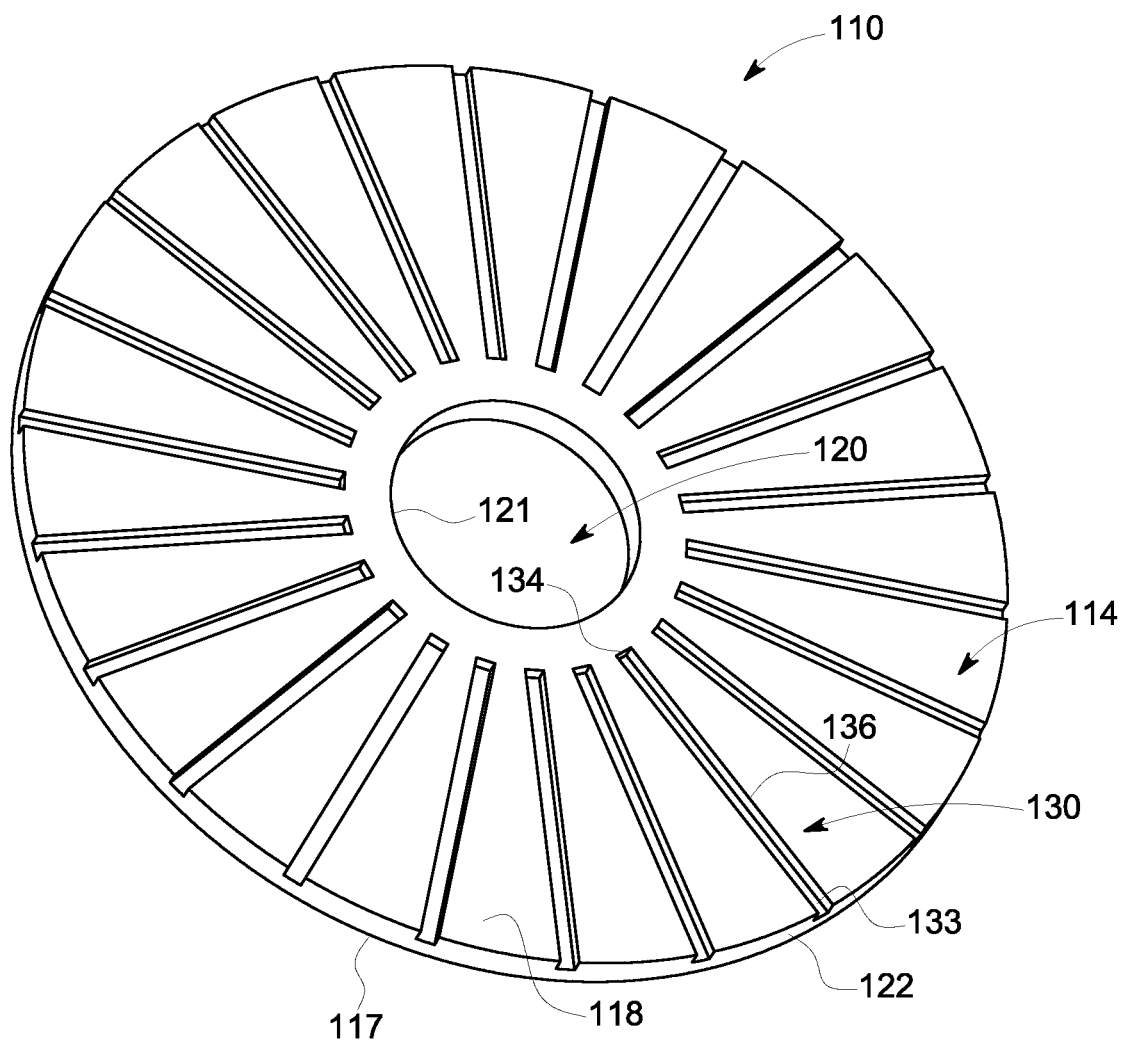
FIG. 5 is a partial perspective view of an injector seal in accordance with another aspect of the exemplary embodiment.

FIG. 5 illustrates an injector seal 110 in accordance with another aspect of the exemplary embodiment. Injector seal 110 includes a seal body 114 including a first surface 117 and an opposing second surface 118. Seal body 114 also includes a central opening 120 defined by an inner edge 121 and an outer, peripheral, edge 122. A flange member 125 (not shown) extends about inner edge 121 and projects outward from first surface 117. Flange member 125 (not shown) provides a seal about injector assembly 50 that prevents combustions gases from combustion chamber 34 from entering fluid flow passage 36. Injector seal 110 also includes a plurality of passages 130 that extend along seal body 114. Each passage 130 includes a first end 133 that extends to a second end 134 through an intermediate portion 136. First end 133 is exposed at outer edge 122 while second end 134 is exposed at second surface 118 spaced from inner edge 121. In further accordance with the exemplary embodiment shown, intermediate portion 136 is exposed along second surface 118. Passages 130 provide a conduit that allows gases flowing within fluid flow passage 36 to pass onto, and cool, an end portion (not separately labeled) of injector assembly 50. Thus, injector seal 110 not only prevents combustion gasses from entering into fluid flow passage 36 but also provides passage for fluid to impinge upon and cool injector assembly 50.

Figure 6:
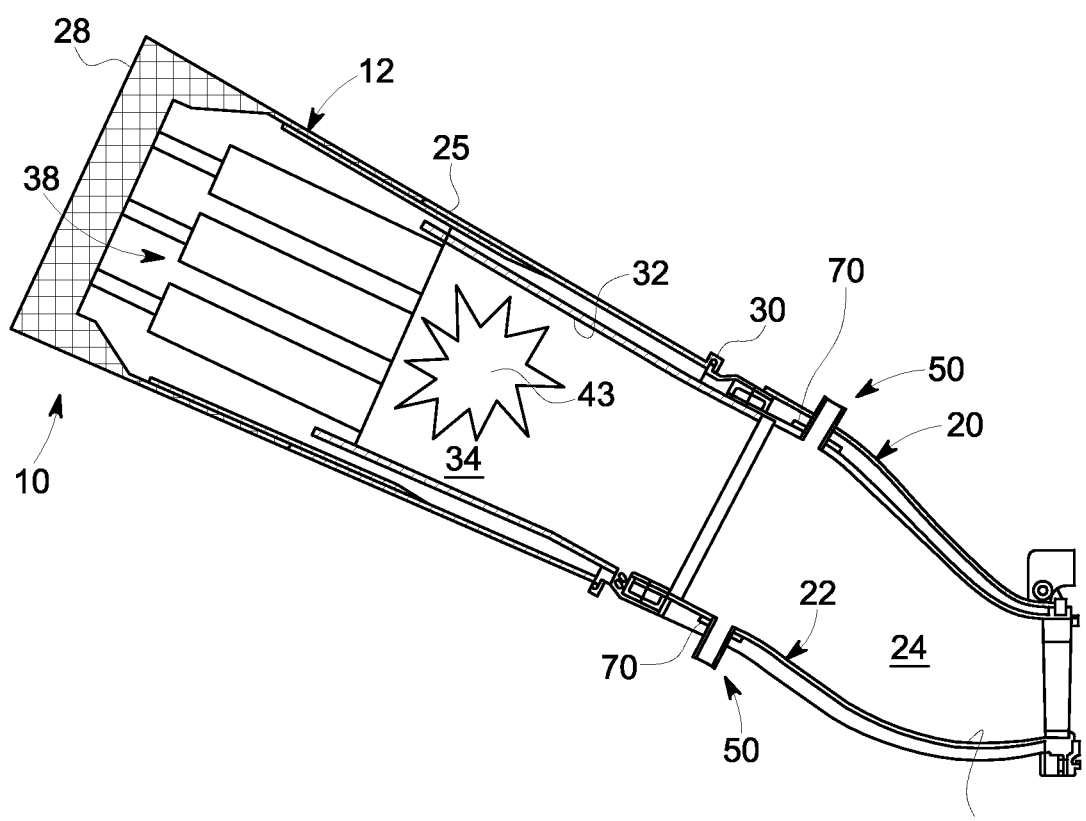
FIG. 6 is a partial cross-section view of a combustor assembly in accordance with another aspect of the exemplary embodiment including the injector seal of FIG. 3.

At this point it should be understood that the exemplary embodiments describe an injector seal that prevents combustion gases from escaping from a combustion flow path while at the same time providing passage for fluid directed at an end portion of an injector for cooling purposes. The passage may extend through the injector seal at an angle that guides the fluid directly onto the end of the injector. Alternatively, the passages may also extend through the seal along a substantially linear path or from an outer edge toward an inner edge of the injector seal. Also, while shown and described as being associated with injectors mounted in a combustor liner, the injector seal may also be employed to seal about an injector provided in a transition piece liner as shown in FIG. 6 wherein like reference numbers represent corresponding parts in the respective views.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An injector seal for a gas turbomachine comprising:
a seal body having a first surface configured and disposed to be arranged between an inner surface of an outer wall and an outer surface of one of a combustor liner and a transition piece liner, an opposing second surface configured and disposed to be arranged on, parallel to, and in contact with the outer surface of the one of the combustor liner and the transition piece liner, a central opening configured and disposed to receive a gas turbomachine injector, an outer edge, and a plurality of passages extending through the seal body, the plurality of passages being configured and disposed to guide a fluid at the first surface through the second surface.

2. The injector seal according to claim 1, wherein each of the plurality of passages includes a first end exposed at the first surface that extends to a second end exposed at the second surface through an intermediate portion.

3. The injector seal according to claim 2, wherein the first end is offset relative to the second end.

4. The injector seal according to claim 1, wherein each of the plurality of passages includes a first end exposed at the outer edge that extends to a second end exposed at the second surface through an intermediate portion.

5. The injector seal according to claim 4, wherein the intermediate portion is exposed at the second surface.

6. The injector seal according to claim 1, further comprising: a flange member extending about the central opening radially outward of one of the first and second opposing surfaces.

7. The injector seal according to claim 1, wherein the seal body comprises a nickel-based alloy.

8. An injector seal for a gas turhomachine comprising:
a seal body having a first surface, an opposing second surface configured and disposed to he arranged on, parallel to and in contact with an outer surface of one of a combustor liner and a transition piece liner, a central opening configured and disposed to receive a gas turbomachine injector, an outer edge, a plurality of passages extending through the seal body, the plurality of passages being configured and disposed to guide a fluid at the first surface through the second surface, and a flange member extending about the central opening radially outward of one of the first and second opposing surfaces, wherein an inner diameter of the flange member increases in a direction away from the outer surface.

9. The injector seal according to claim 8, wherein each of the plurality of passages includes a first end exposed at the first surface that extends to a second end exposed at the second surface through an intermediate portion.

10. The injector seal according to claim 9, wherein the first end is offset relative to the second end.

11. The injector seal according to claim 8, wherein each of the plurality of passages includes a first end exposed at the outer edge that extends to a second end exposed at the second surface through an intermediate portion.

12. The injector seal according to claim 11, wherein the intermediate portion is exposed at the second surface.

13. The injector seal according to claim 8, wherein the seal body comprises a nickel-based alloy.

14. A gas turbomachine comprising:
a compressor portion;
a turbine portion operatively connected to the compressor portion;
a combustor assembly including at least one combustor including a combustor liner defining a combustion chamber;
a transition piece fluidically connecting the at least one combustor and the turbine portion, the transition piece including a transition piece liner defining a combustion passage;
an injector assembly including at least one injector extending into one of the combustion chamber and the combustion passage through a corresponding one of the combustor liner and transition piece liner; and
an injector seal including a seal body having a first surface configured and disposed to be arranged between an inner surface of an outer wall and an outer surface of one of a combustor liner and a transition piece liner, and an opposing second surface that is disposed on, parallel to, and in contact with the outer surface of the one of the combustor liner and transition piece liner, a central opening receiving the injector, an outer edge, and a plurality of passages extending through the seal body, the plurality of passages being configured and disposed to guide a fluid at the first surface through the second surface.

15. The gas turbormachine according to claim 14, wherein each of the plurality of passages includes a first end exposed at the first surface that extends to a second end exposed at the second surface through an intermediate portion.

16. The gas turbomachine according to claim 15, wherein the first end is offset relative to the second end.

17. The gas turbomachine according to claim 14, wherein each of the plurality of passages includes a first end exposed at the outer edge that extends to a second end exposed at the second surface through an intermediate portion.

18. The gas turbomachine according to claim 17, wherein the intermediate portion is exposed at the second surface.

19. The gas turbomachine according to claim 14, further comprising: a flange member extending about the central opening radially outward of one of the first and second opposing surfaces.

20. The gas turbomachine according to claim 19, wherein the flange member extends into a fluid flow passage extending along the one of the combustion chamber and the combustion passage.

21. The gas turbomachine according to claim 14, wherein the injector assembly comprises a late lean injector (LLI) arranged in the combustion chamber.

22. The gas turbomachine according to claim 14, wherein the seal body comprises a nickel-based alloy.

23. A gas turbomachine comprising:
a compressor portion;
a turbine portion operatively connected to the compressor portion;
a combustor assembly including at least one combustor including a combustor liner defining a combustion chamber;
a transition piece fluidically connecting the at least one combustor and the turbine portion, the transition piece including a transition piece liner defining a combustion passage;
an injector assembly including at least one injector extending into one of the combustion chamber and the combustion passage through a corresponding one of the combustor liner and transition piece liner; and
an injector seal including a seal body having a first surface, an opposing second surface that is disposed on, parallel to, and in contact with an outer surface of one of a combustor liner and transition piece liner, a central opening receiving the injector, an outer edge, and a plurality of passages extending through the seal body, the plurality of passages being configured and disposed to guide a fluid at the first surface through the second surface, and a flange member extending about the central opening radially outward of one of the first and second opposing surfaces, wherein an inner diameter of the flange member increases in a direction away from the outer surface.

24. The gas turbormachine according to claim 23, wherein each of the plurality of passages includes a first end exposed at the first surface that extends to a second end exposed at the second surface through an intermediate portion.

25. The gas turbomachine according to claim 24, wherein the first end is offset relative to the second end.

26. The gas turbomachine according to claim 23, wherein each of the plurality of passages includes a first end exposed at the outer edge that extends to a second end exposed at the second surface through an intermediate portion.

27. The gas turbomachine according to claim 26, wherein the intermediate portion is exposed at the second surface.

28. The gas turbomachine according to claim 23, wherein the flange member extends into a fluid flow passage extending along the one of the combustion chamber and the combustion passage.

29. The gas turbomachine according to claim 23, wherein the injector assembly comprises a late lean injector (LLI) arranged in the combustion chamber.

30. The gas turbomachine according to claim 23, wherein the seal body comprises a nickel-based alloy.

* * * * *